(12) United States Patent
Tian

(10) Patent No.: US 11,576,363 B2
(45) Date of Patent: Feb. 14, 2023

(54) FRUIT FLY TRAP

(71) Applicant: Yumei Tian, Dongguan (CN)

(72) Inventor: Yumei Tian, Dongguan (CN)

(*) Notice: Subject to any disclaimer, the term of this patent is extended or adjusted under 35 U.S.C. 154(b) by 106 days.

(21) Appl. No.: 17/096,935

(22) Filed: Nov. 12, 2020

(65) Prior Publication Data

US 2022/0142139 A1    May 12, 2022

(51) Int. Cl.
*A01M 1/10* (2006.01)
*A01M 1/16* (2006.01)
*A01M 1/02* (2006.01)

(52) U.S. Cl.
CPC .............. *A01M 1/106* (2013.01); *A01M 1/02* (2013.01); *A01M 1/165* (2013.01); *A01M 2200/012* (2013.01)

(58) Field of Classification Search
CPC ........ A01M 1/106; A01M 1/02; A01M 1/165; A01M 1/16; A01M 1/00; A01M 1/14; A01M 2200/012; A01M 3/04; A01M 5/06
See application file for complete search history.

(56) References Cited

U.S. PATENT DOCUMENTS

| | | | | |
|---|---|---|---|---|
| 965,364 A * | 7/1910 | Boos | ...................... | A01M 1/14 43/115 |
| 4,638,592 A * | 1/1987 | Schneidmiller | ....... | A01M 1/106 426/1 |
| 6,067,746 A * | 5/2000 | Kistner | .................. | A01M 3/022 43/135 |
| 2005/0005503 A1 * | 1/2005 | Bragg | ..................... | A01M 1/02 43/115 |
| 2021/0368765 A1 * | 12/2021 | Feo | .......................... | A01M 1/02 |

* cited by examiner

*Primary Examiner* — Joshua J Michener
*Assistant Examiner* — Nicole Paige MacCrate

(57) ABSTRACT

The invention discloses a fruit fly trap comprising a flowerpot, a cover plate and flypaper, wherein the cover plate is provided with a plurality of inlets for allowing the fruit fly to enter the interior of the flowerpot, each inlet respectively extends towards a bottom direction of the flowerpot to form a lengthened inlet pipe, and the flypaper is mounted on the cover plate by a bracket. According to the invention, the fruit fly can be attracted into the interior of the flowerpot, the lengthened inlet pipe makes the fruit fly difficult to escape until death, the flypaper can stick the flying fruit fly, and the fruit fly can be effectively attracted and killed.

12 Claims, 7 Drawing Sheets

FRUIT FLY TRAP

TECHNICAL FIELD

The invention relates to the technical field of pest trapping and killing devices, in particular to a fruit fly trap.

BACKGROUND OF THE PRESENT INVENTION

The fruit fly widely exists in global temperate and tropical climate regions. Because it is mainly fed by fruits and yeasts and rotten fruits are easy to breed the yeasts, the fruit fly multiplies easily in the living region of people. The fruit fly intrudes into the living region of people and can spread and breed bacteria. People may have diseases by eating polluted foods, which cause great harm to human health.

SUMMARY OF THE PRESENT INVENTION

The invention is directed to overcome the defects in the prior art and provides a fruit fly trap.

In order to achieve the purpose, the invention provides a fruit fly trap comprising a flowerpot for storing attractants, a cover plate and a plurality of flypapers for sticking the fruit fly, wherein the cover plate is mounted at a top opening of the flowerpot and provided with a plurality of inlets for allowing the fruit fly to enter the interior of the flowerpot; and each inlet respectively extends towards a bottom direction of the flowerpot to form a lengthened inlet pipe, and the flypaper is mounted on the cover plate by a bracket.

A plurality of cover plate supporting bulges annularly distributed are arranged on an inner side wall of the flowerpot, a plurality of limit clamping blocks respectively positioned above the corresponding cover plate supporting bulges are arranged on the inner side wall of the flowerpot, and the cover plate is clamped on the cover plate supporting bulge and positioned between the limit clamping block and the cover plate supporting bulge.

The surface of the limit clamping block is formed to an arc surface.

Each bracket comprises a connecting strip and a flypaper mounting seat, a plurality of connecting strip slots are formed in a top surface of the cover plate, and the lower ends of each connecting strip are respectively inserted into the corresponding connecting strip slots on the cover plate, and the flypaper is respectively mounted on the top of the connecting strip by the corresponding flypaper mounting seats and is positioned above the inlet.

The flypaper is folded into a V shape along the middle line thereof.

The flypaper mounting seat comprises a socket tip, a limit clamping rod and a limit clamping block with a V-shaped cross section, the middle folding part of the limit clamping block is connected with a wall body of the socket tip, and the limit clamping rod is positioned inside the middle folding part of the limit clamping block and parallel to a middle folding line of the limit clamping block; and the flypaper is matched with the limit clamping rod by the limit clamping block so as to be mounted on the flypaper mounting seat, and the flypaper is positioned between the limit clamping rod and the limit clamping block.

Artificial leaves are arranged on the cover plate.

Compared with the prior art, the invention has the following beneficial effects.

The invention has a simple and novel structure and a reasonable design. The fruit fly can be attracted to the interior of the flowerpot, and can hardly escape from the flowerpot until death due to the design of the lengthened inlet pipe. The flying fruit fly can be stuck by the flypaper. The fruit fly can be effectively attracted and killed by the invention, which provides a healthy and comfortable living environment for people.

DETAILED DESCRIPTION OF THE PRESENT INVENTION

Figure 1:
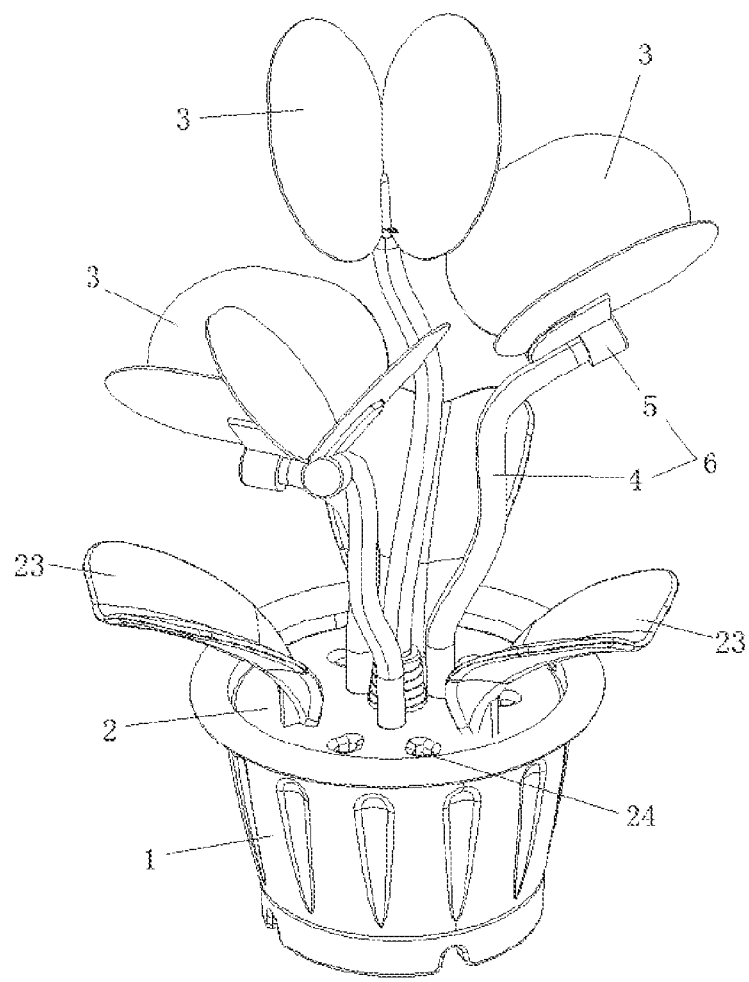
FIG. 1 is a structurally schematic view of a fruit fly trap.
Figure 2:
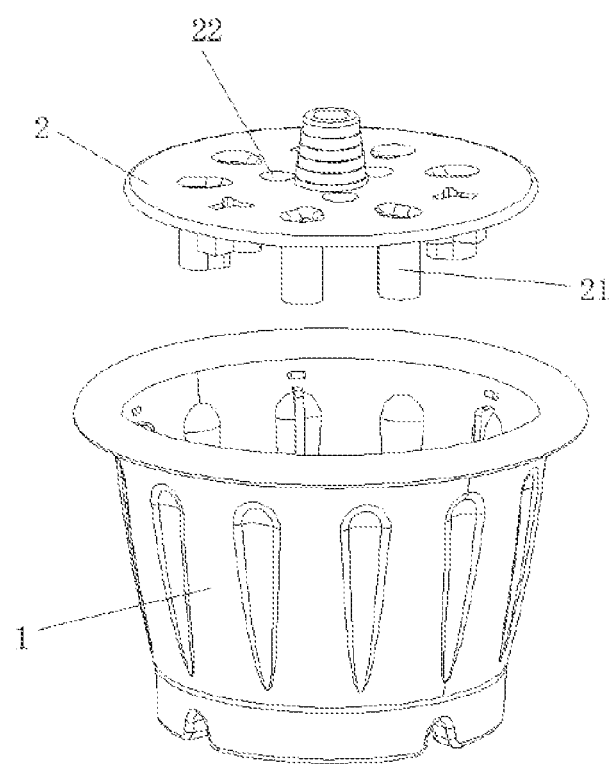
FIG. 2 is a schematic view showing the installation of a cover plate and a flowerpot of the fruit fly trap.
Figure 3:
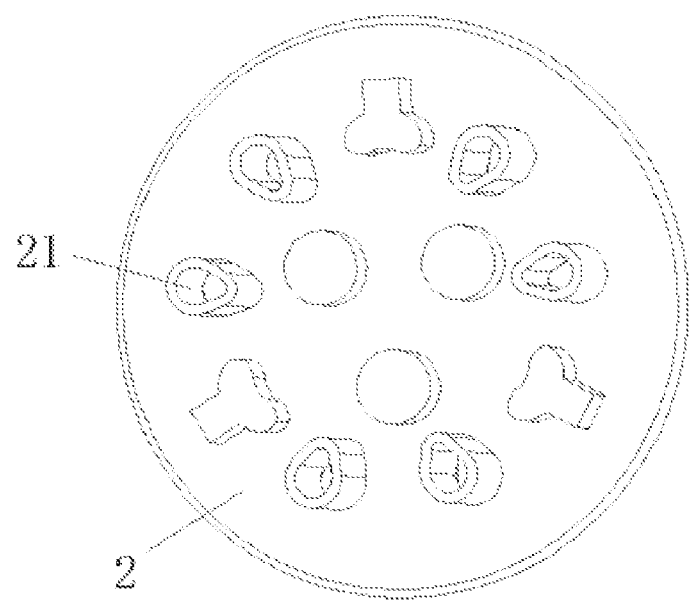
FIG. 3 is a structurally schematic view showing a bottom of the cover plate of the fruit fly trap.
Figure 4:
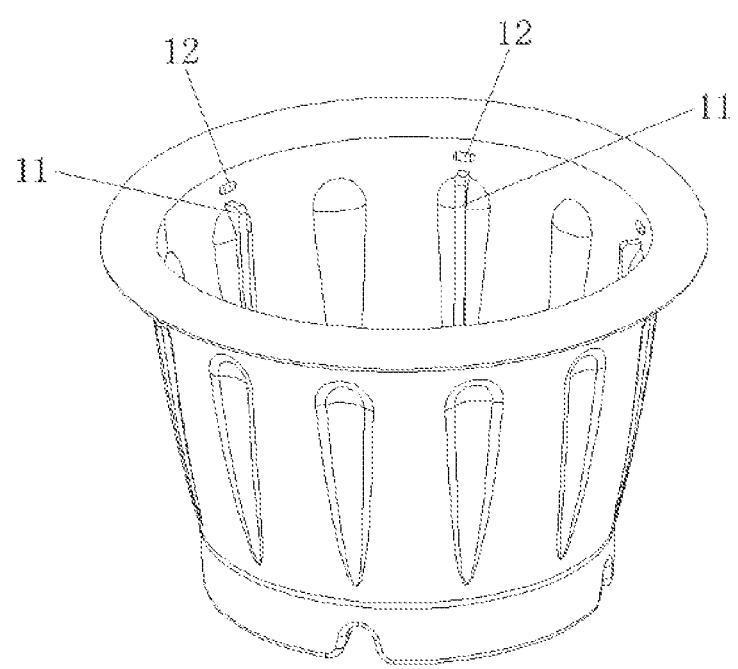
FIG. 4 is a structurally schematic view of the flowerpot of the fruit fly trap.
Figure 5:
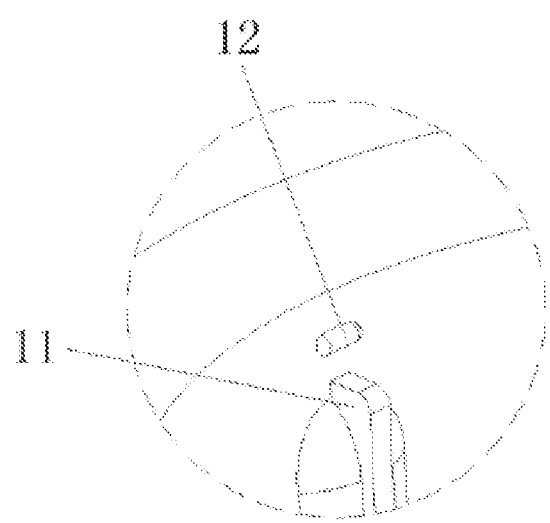
FIG. 5 is a structurally enlarged view of a supporting bulge portion of the cover plate of the fruit fly trap.
Figure 6:
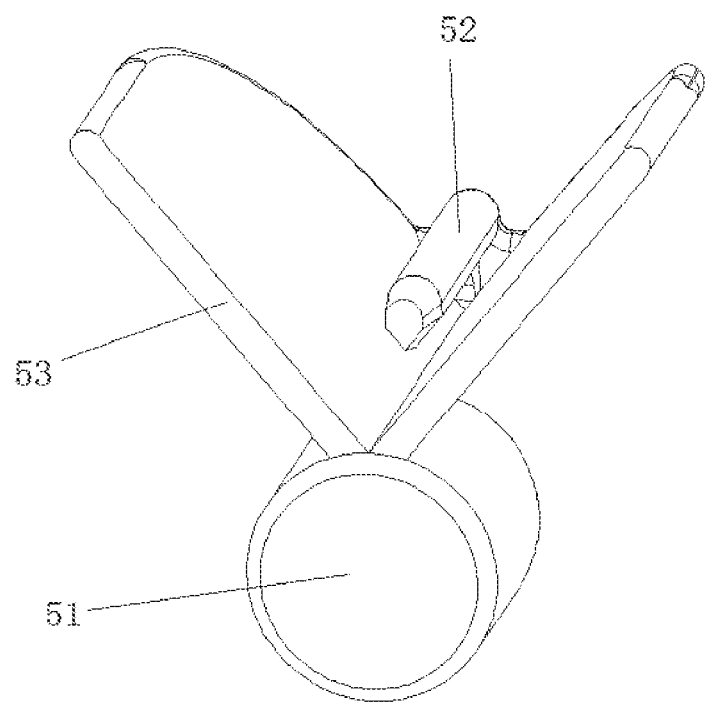
FIG. 6 is a structurally schematic view I of a flypaper mounting seat of a fly attracting trap.
Figure 7:
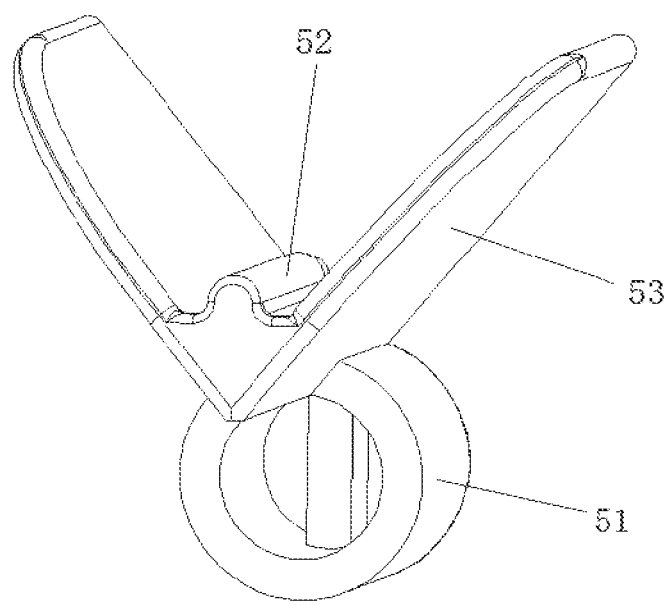
FIG. 7 is a structurally schematic view II of the flypaper mounting seat of the fruit fly trap.

Referring to FIGS. 1 to 7, an embodiment of the present invention provides a fruit fly trap including a flowerpot 1 for storing attractants such as a sour and sweet attractant, a cover plate 2, and a plurality of flypapers 3 for sticking the fruit fly, the structure of each of which and the operation principle thereof will be described.

The cover plate 2 is mounted at a top opening of the flowerpot 1 and provided with a plurality of inlets 24 for allowing the fruit fly to enter the interior of the flowerpot 1; and each inlet 24 respectively extends towards a bottom direction of the flowerpot 1 to form a lengthened inlet pipe 21, and the flypaper 3 is mounted on the cover plate 2 by a bracket 6.

Preferably, a plurality of cover plate supporting bulges 11 annularly distributed are arranged on an inner side wall of the flowerpot 1, a plurality of limit clamping blocks 12 respectively positioned above the corresponding cover plate supporting bulges 11 are arranged on the inner side wall of the flowerpot 1, and the cover plate 2 is clamped on the cover plate supporting bulge 11 and positioned between the limit clamping block 12 and the cover plate supporting bulge 11.

Specifically, the surface of the limit clamping block 12 may be formed to an arc surface. The arc surface design of the limit clamping block 12 facilitates the mounting and disassembly of the cover plate 2.

Each bracket 6 comprises a connecting strip 4 and a flypaper mounting seat 5, a plurality of connecting strip slots 22 are formed in a top surface of the cover plate 2, and the lower ends of each connecting strip 4 are respectively inserted into the corresponding connecting strip slots 22 on the cover plate 2; and the flypaper 3 is respectively mounted on the top of the connecting strip 4 by the corresponding flypaper mounting seat 5 and is positioned above the inlet 24. Among them, the flypaper 3 is preferably provided as a flypaper having adhesive on both sides.

During the specific implementation, the flypaper 3 can be folded into a V shape along the middle line of the flypaper 3, the flypaper mounting seat 5 comprises a socket tip 51, a limit clamping rod 52 and a limit clamping block 53 with a V-shaped cross section, the middle folding part of the limit clamping block 53 is connected with a wall body of the socket tip 51, and the limit clamping rod 52 is positioned inside the middle folding part of the limit clamping block 53 and parallel to the middle folding line of the limit clamping block 53; and the flypaper 3 is matched with the limit clamping rod 52 by the limit clamping block 53 so as to be mounted on the flypaper mounting seat 5, and the flypaper 3 is positioned between the limit clamping rod 52 and the limit clamping block 53. When the flypaper is replaced, a user only needs to pull out the old flypaper, then inserts the new flypaper between the limit clamping rod 52 and the limit clamping block 53; and then the limit clamping block 53 can be stuck by the self viscosity of the flypaper, so that it is simple and convenient to mount and dismount the flypaper 3.

As shown in FIG. 1, the cover plate 2 is provided with artificial leaves 23, which can make the product more beautiful, play a decorative role, and improve the simulation effect.

The working principle of the invention is as follows.

The fruit fly smells the smell of the attractants emitted in the flowerpot, then enter the flowerpot through the inlet in the cover plate, and arrive at the interior of the the flowerpot through the lengthened inlet pipe. Due to the lengthened design of the lengthened inlet pipe, the fruit fly can be trapped inside the flowerpot and cannot escape until death after entering the flowerpot, and the flying fruit fly can be stuck by the external flypaper to realize capture.

In summary, the invention has a simple and novel structure and a reasonable design. The fruit fly can be attracted to the interior of the flowerpot, the fruit fly can hardly escape by the lengthened inlet pipe until death, the flying fruit fly can be stuck by the flypaper, and the fruit fly can be effectively attracted and killed.

The above-described embodiments are preferred embodiments of the present invention. However, the embodiments of the present invention are not limited to the above-described embodiments. Any other changes, modifications, substitutions, combinations, simplifications, which do not depart from the spirit and principles of the present invention, are intended to be included within the scope of the present invention.

The invention claimed is:

1. A fruit fly trap, comprising:
a flowerpot used for storing an attractant;
a cover plate; and
a plurality of flypapers used for sticking a fruit fly;
wherein the cover plate is mounted at a top opening of the flowerpot and comprises a plurality of inlets for allowing the fruit fly to enter an interior of the flowerpot; and each inlet respectively extends towards a bottom direction of the flowerpot to form a lengthened inlet pipe, and the plurality of flypapers are each mounted on the cover plate by a bracket;
wherein a plurality of cover plate supporting bulges annularly distributed are arranged on an inner side wall of the flowerpot, a plurality of limit protruding blocks respectively positioned above the corresponding cover plate supporting bulges are arranged on the inner side wall of the flowerpot, wherein the plurality of cover plate supporting bulges each protrude from the inner side wall of the flowerpot in a radially inward direction, and wherein the plurality of limit protruding blocks each protrude from the inner side wall of the flowerpot in a radially inward direction; and wherein the cover plate is clamped on each cover plate supporting bulge and positioned and clamped between each limit protruding block and the respective cover plate supporting bulge.

2. The fruit fly trap according to claim 1, wherein each bracket comprises a connecting strip and a flypaper mounting seat, wherein a plurality of connecting strip slots are defined in a top surface of the cover plate, and a lower end of each connecting strip is inserted into the respective connecting strip slot in the cover plate; and the respective flypaper is mounted on a top of each connecting strip by the respective flypaper mounting seat and is positioned above the plurality of inlets.

3. The fruit fly trap according to claim 2, wherein each flypaper is folded into a V shape along a middle line on the flypaper.

4. The fruit fly trap according to claim 3, wherein each flypaper mounting seat comprises:
a socket head;
a limit clamping rod; and
a limit clamping block having a V-shaped cross section;
wherein a middle folding part of the limit clamping block is directly connected with a wall body of the socket head, and the limit clamping rod is positioned inside the middle folding part of the limit clamping block and parallel to a middle folding line of the limit clamping block; and the respective flypaper is fitted with the limit clamping rod by the limit clamping block so as to be mounted on the flypaper mounting seat, and the flypaper is positioned and clamped between the limit clamping rod and the limit clamping block.

5. The fruit fly trap according to claim 4, wherein the socket head is a hollow tube having an open end and a closed end, wherein one end of the connecting strip is inserted into the open end of the socket head to be connected with the socket head.

6. The fruit fly trap according to claim 4, wherein each limit clamping block comprises two halves folded along the middle folding line and forming a fixed angle relative to each other, and wherein the middle folding part of the limit clamping block is fixedly and integrally connected with the wall body of the respective socket head.

7. The fruit fly trap according to claim 1, wherein surface of each limit clamping block is formed as an arc surface.

8. The fruit fly trap according to claim 1, wherein artificial leaves are arranged on the cover plate.

9. The fruit fly trap according to claim 1, wherein the plurality of cover plate supporting bulges are in one-to-one correspondence with the plurality of limit protruding blocks.

10. The fruit fly trap according to claim 6, wherein the two halves of each limit clamping block are substantially symmetrical with respect to the respective socket head.

11. The fruit fly trap according to claim 6, wherein the two halves of the limit clamping block is substantially symmetrical with respect to the limit clamping rod.

12. The fruit fly trap according to claim 6, wherein respective edges of adjacent partial portions of the two halves of each limit clamping block at one end of the middle folding line of the limit clamping block are fixedly connected to each other through a plate, and wherein the limiting clamping rod is fixedly connected to the plate and runs parallel with and is spaced apart from the middle folding line of the limit clamping block by a gap, and wherein the respective flypaper is clamped at the gap between the limit clamping rod and the middle folding part of the limit clamping block.

* * * * *